Oct. 31, 1950
S. DREWS
2,528,122
TRANSMISSION FOR SLOW-MOTION SIGNS
Filed Dec. 29, 1948
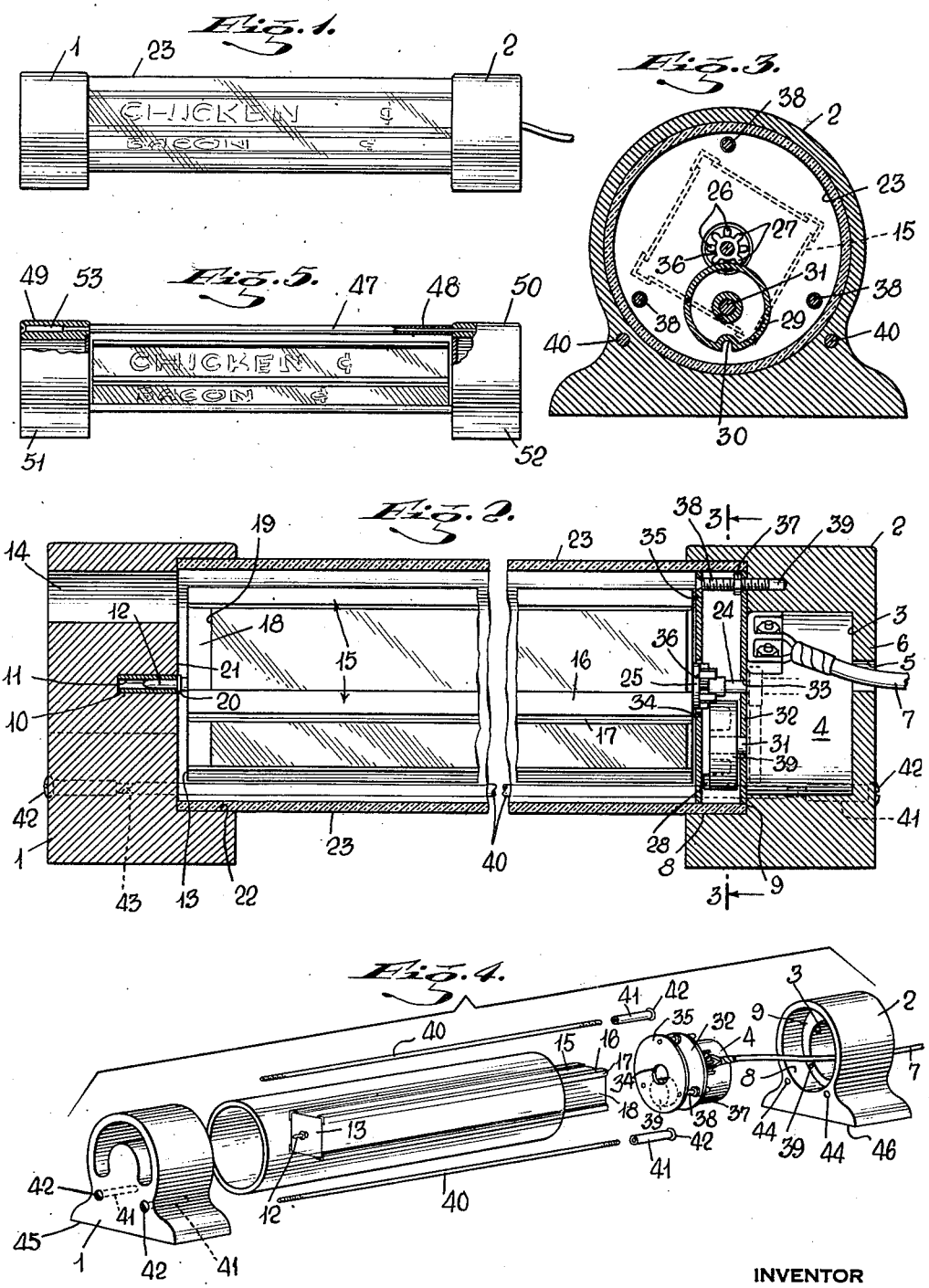
INVENTOR
SHELDON DREWS
BY
*Gustav Drews*
ATTORNEY Patented Oct. 31, 1950

2,528,122

UNITED STATES PATENT OFFICE 2,528,122

TRANSMISSION FOR SLOW-MOTION SIGNS

Sheldon Drews, Annapolis, Md.

Application December 29, 1948, Serial No. 67,959

2 Claims. (Cl. 40—33)

This invention relates to slow motion signs in general and more especially to an improved actuating mechanism.

Among the objects of the present device, it is aimed to provide an improved transmission or actuating mechanism for actuating a slow motion sign.

It is still another object of the present invention to provide an improved transmission or actuating mechanism for a slow motion sign which can be readily assembled, produced at low cost, and which will include a minimum of moving parts.

These and other features, capabilities and advantages of the invention will appear from the subjoined detail description of specific embodiments thereof illustrated in the accompanying drawings, in which:

Fig. 1 is a side elevation of one embodiment.

Fig. 2 is an enlarged longitudinal section of the same partly broken away.

Fig. 3 is a transverse section on the line 3—3 of Fig. 2.

Fig. 4 is an exploded perspective view of the several parts of this embodiment.

Fig. 5 is a side elevation partly broken away of another embodiment.

In the embodiment shown in Figs. 1 to 4, there are provided two end brackets or supporting blocks, the first end bracket 1 and the second end bracket 2. The supporting block 2 is provided with a chamber 3 to receive the motor 4. The block 2 has an opening 5 in its rear wall 6 to enable the conductor 7 connected to the motor 4 to extend therethrough to a suitable source of current supply. The block 2 is also provided with a cylindrical recess 8 defined from the chamber 3 by the shoulder 9.

The block 1 is provided with a recess 10 to receive the tubular bearing 11 for the pin 12 of the support or sign supporting bar 13. The block 1 also is provided in the present instance with a U-shaped or horseshoe shape recess 14 to facilitate access to the notices or signs supported on the bar 13. The bar 13 in the present instance is rectangular in cross section and has at its corners triangular shaped flange strips 15. The strips 15 may be secured to the bar 13 in any suitable manner, or may even be formed integral with the bar 13 so long as the portions 16 and 17 of each have a clearance between the free edges thereof and the faces 18 of the bar to receive a notice having print thereon such as the notice 19 consisting of a sheet of paper, Celluloid, or the like, on which the notice is impressed. The pin 12, see Fig. 2, preferably has a collar 20 thereon to form an abutment and engage the outer edge of the bearing 11 and thus space the adjacent end of the bar 13 from the inner face 21 of the block 1.

The face 21 of the block 1 is formed at the inner end of the cylindrical recess 22 formed in the block 1. The diameter of the recess 22 is substantially identical to the diameter of the recess 8 in the block 2 so that they may receive the opposite ends of the transparent tubular casing or member 23. This tubular member 23 may be composed of glass, Celluloid, or any other suitable transparent material. The end of the bar 13 adjacent the motor 4 has in the present instance extending therefrom a fixed shaft 24 having mounted thereon adjacent the end of the bar 13 the collar or disk 25. Extending from the inner face of the small disk 25 there is provided a gear consisting of four short teeth 26 and four long teeth 27 the short teeth 26 being formed to cooperate with the teeth 28 extending axially and inwardly from the drum 29 having adjacent the teeth 28 the recess 30 to cooperate with the long teeth 27. The drum 29 is fixed on the shaft 31 of the motor 4 which shaft 31 extends through the inner disk 32 positioned in the recess 8 of the block 2. The shaft 24 is journaled in the opening 33 formed in the inner disk 32. The small disk 25 is positioned adjacent the central opening 34 in the outer disk 35. The disks 32 and 35 are spaced from one another to position the teeth 26 and 27 of the gear 36 in cooperative relation with the teeth 28 and recess 30 of the drum 29. An examination of Fig. 3 with Fig. 2 will reveal the fact that gear 36 can be quickly assembled into cooperative relationship with the drum 29 by merely advancing the bar 13 with the gear 36 and turning it until the shaft 24 finds the opening 33 in the inner disk 32. The cooperation of the small disk 25 with the opening 34 in the outer disk 35 aids materially in effecting the assembly or cooperative relationship of the gear 36 with the drum 29. The objective in assembling is of course—if the outer cylindrical periphery of the drum 29 is disposed adjacent the opening 33 as shown in Fig. 3, that is with the recess 30 remote from the opening 33—to have the inner edges of two adjacent long teeth 27 engage the cylindrical outer periphery of the drum 29 as shown in Fig. 3, when the shaft 24 due to the cooperation of the disk 25 with the opening 34 will quickly find the opening 33 in the outer disk 32. Of course if the recess 30 were disposed adjacent to the opening 33 the bar 13 would only have to be turned until one of the long teeth 27 entered the recess 30 when the shaft 24 would quickly find the opening 33.

The outer disk 32 and the inner disk 35 are maintained in spaced relationship to one another by the cooperation of the nuts 37 and the screws 38, three being shown in the present instance. The screws 38 extend through aligned openings in the disks 32 and 35 into the shoulder 9 of the block 2 with the nuts 37 being disposed between the disks 32 and 35 and in engagement with the face of the disk 32.

After the disks 32 and 35 with the motor 4 are positioned in the block 2 with the screws 37 positioned in the openings 39, the opening 33 in the disk 32 will be in alignment with the bearing 11 in the block 1 that is centrally of the inner peripheries of the annular recesses 8 and 22. It will then only be necessary to position the transparent tube 23 in the spaces between the outer peripheries of the disks 32 and 35 and the inner periphery of the recess 8, then to position the bar 13 with the shaft 24 in the disk 32 and thereupon to position the block 1 so that it will receive the transparent tubular member 23 in the recess 22 and to receive the pin 12 in the bearing 11.

In this assembled position, the two blocks 1 and 2 may then be secured in position by any suitable means. In the present instance there are provided the tie rods 40, two in number, which are threaded at their ends to receive the threaded thimbles 41, having slotted heads 42 thereon. The thimbles 41 in Fig. 4 are shown in position in the block 1 to receive the tie rods 40. The block 1 as shown is provided with two openings 43 to receive the tie rods 40 and one set of thimbles 41 and similarly the block 2 is provided with two openings 44 to receive the tie rods 40 and the other set of thimbles 41.

The openings 43 and 44 are shown adjacent the lower flat faces 45 and 46 of the blocks 1 and 2 respectively so that they may be out of the line of vision of the reader of the notices on the sheets 19 when mounted on the bar 13.

Preferably the lower faces 45 and 46 as clearly shown in Fig. 4 would ordinarily be in alignment with one another to constitute the feet or base of the blocks 1 and 2.

In the embodiment shown in Figs. 1, 2, 3 and 4, the transparent tubular member 23 will serve as the spacer for the two blocks 1 and 2 and therefore also position the pin 12 and gear 36 so that it may rotate freely.

In the embodiment of Fig. 5, on the other hand, where the cylindrical member 23 is omitted, there is provided a tubular spacer 47 mounted on the tie rod 48 which extends through extensions 49 and 50 in the upper part of the blocks 51 and 52 respectively with thimbles 53 similar to the thimbles 41 engaging the ends of the tie rod 48.

The motor 4 may be of the light horsepower variety known as the Talk Motors. The shaft as an instance the shaft 31 of the motor 4 may be connected so that it will make two revolutions per minute. In such case obviously, the bar 13 with the gear 36 and drum 29 will complete two revolutions per minute and come to rest eight times for displaying the four notices twice every minute. By actual count it has also been found that with a gear 36 and drum 29 as illustrated when employed with a motor 4 the shaft of which will complete two revolutions per minute, the display position or position of rest will approximate seven seconds and the movement from one display position to the next will consume approximately one-half second, or a total of sixty seconds for eight successive displays.

In the interest of effecting a free rotation of the pin 12 in the bearing 11 of the end block 1 and the shaft 24 in the disk 32 of the end block 2, the tubular element 23 when serving as a spacer will preferably have a friction fit in the end blocks 1 and 2 so that when the thimbles 41 are drawn tight on the tie rods 40, the element 23 will cooperate with the tie rods to prevent endwise movement of the end blocks relative to the tubular member 23 and consequently insure an effective alignment of the pin 12 in the bearing 11 of the end block 1 and the shaft 24 in the disk 32 of the end block 2 at all times.

It is obvious that various changes and modifications may be made to the details of construction without departing from the general spirit of the invention as set forth in the appended claims.

I claim:

1. In a transmission from an electric motor for a sign, the combination of first and second end brackets with the motor disposed inside of the second end bracket, an inner bearing disk and an outer bearing disk fixed to the second end bracket with the outer bearing disk enclosing the motor in said second end bracket, a motor shaft extending outwardly from the motor and journalled in said axially outer disposed disk, a drum disposed between said disks and fixed on said motor shaft, said drum having a single axially extending recess and a pair of axially inwardly extending teeth extending from said drum in alinement with the sides of said recess, a support, a pin on one end of the support and journalled in the first end bracket, the axially inner disk having a central opening, a gear disposed between said bearing disks, fixed to the other end of the support and having an even number of equally spaced teeth, half of which said teeth being axially longer than the others with a long tooth between each two shorter teeth, the shorter teeth cooperating with the two teeth of said drum and the long teeth meshing with the recess of said drum, said gear having a shaft journalled in said outer disk and removable through the central opening in said inner disk, and a small disk concentric with and fixed to said gear between the gear and said other end of the support, the opening in said axially inner disk just clearing said small disk to receive said small disk and cooperate with the same as an index to position the gear shaft in said inner disk and said gear in cooperative relationship with said drum.

2. The combination as set forth in claim 1 in which the end brackets have cylindrical recesses, the opening in said first bracket for said pin being centrally disposed in the cylindrical recess in said first bracket, said inner and outer disks being round and disposed in the cylindrical recess of said second end bracket with annular spaces between the peripheries of said disks and the inner cylindrical face of the cylindrical recess of said second end bracket, a transparent tubular casing having a friction fit between its ends and said cylindrical recesses, one end of said casing being disposed between the cylindrical inner face of said second bracket and the peripheries of said disks, and tie rods for securing the bearing brackets to one another against said tubular member with the tubular member as a spacer to allow said pin to rotate freely in said first end bracket and to allow the shaft of said gear to rotate freely in said axially outer disk.

SHELDON DREWS.

REFERENCES CITED

The following references are of record in the file of this patent:

UNITED STATES PATENTS

| Number | Name | Date |
|---|---|---|
| 1,623,837 | Gutierrez | Apr. 5, 1927 |
| 1,680,982 | Goerk et al. | Aug. 14, 1928 |
| 1,760,746 | Chapman | May 27, 1930 |
| 1,823,075 | Wilson | Sept. 15, 1931 |